United States Patent [19]
Rothe

[11] Patent Number: 6,053,560
[45] Date of Patent: Apr. 25, 2000

[54] CONVERTIBLE VEHICLE

[75] Inventor: Karl Rothe, Bramsche, Germany

[73] Assignee: Wilhelm Karmann GmbH, Osnabrueck, Germany

[21] Appl. No.: 08/972,826

[22] Filed: Nov. 18, 1997

[30]     Foreign Application Priority Data

Nov. 25, 1996 [DE]  Germany ................ 296 20 492 U

[51] Int. Cl.⁷ ........................................................ B60J 7/00
[52] U.S. Cl. ............... 296/108; 296/107.16; 296/107.17; 296/107.18
[58] Field of Search ............................. 296/108, 107.16, 296/107.17, 107.18, 107.2, 121, 281.56

[56]             References Cited

U.S. PATENT DOCUMENTS

| | | | |
|---|---|---|---|
| 2,007,873 | 7/1935 | Paulin ...................................... | 296/108 |
| 2,704,225 | 3/1955 | Anschuetz et al. ...................... | 296/108 |
| 5,195,798 | 3/1993 | Klein et al. ......................... | 296/107.17 |
| 5,209,544 | 5/1993 | Benedetto et al. ................. | 296/107.18 |
| 5,584,522 | 12/1996 | Kerner et al. ............................ | 296/108 |
| 5,647,630 | 7/1997 | Jamboe et al. ........................ | 296/108 |
| 5,769,483 | 6/1998 | Danzl et al. ............................ | 296/108 |

FOREIGN PATENT DOCUMENTS

| | | | |
|---|---|---|---|
| 002699868 | 7/1994 | France .................................... | 296/108 |
| 3816060 | 11/1989 | Germany . | |
| 000173626 | 1/1922 | United Kingdom ................... | 296/108 |
| 2240519A | 8/1991 | United Kingdom ................... | 296/108 |

*Primary Examiner*—Joseph D. Pape
*Assistant Examiner*—Kiran Patel
*Attorney, Agent, or Firm*—Jordan and Hamburg LLP

[57]              ABSTRACT

A convertible vehicle has a central roof part which, in the closed position, is supported at the front windshield frame and extends essentially horizontally to a rear roof region with a rear window and which can be shifted into an open position, which frees regions of the passenger compartment of the vehicle. The rear roof region is constructed as a roof shell part, which remains above the vehicle parapet line even when the central roof part is in the open position.

14 Claims, 11 Drawing Sheets

CONVERTIBLE VEHICLE

BACKGROUND OF THE INVENTION

The invention relates to a convertible vehicle having a roof construction which has a central roof part which can be shifted into the open position.

In the case of a known convertible vehicle of this type (DE 38 16 060 C2), a central roof part, which is constructed as a roof shell and extends essentially horizontally in the roof contour, is provided between a front windshield frame and a rear roof region. The rear roof region, which is provided with the rear window, is supported pivotably in the side region of the vehicle body and, when the vehicle is driven with the top down, is lowered into an open position below the parapet line of the vehicle, so that the passenger compartment of the vehicle is completely open, even up to the rear region. In this open position of the convertible roof parts, additional windshield components are required for protecting the passenger compartment of the vehicle, for example, against slip stream and, for the passenger, protection in the event that the vehicle rolls over, is restricted to the supporting action of the front windshield frame.

SUMMARY OF THE INVENTION

It is an object of the invention to provide a convertible vehicle of the type named above, the roof construction of which, even in the case of a roof construction suitable for an enlarged roof surface of a 4-seater vehicle, makes improved passenger protection possible even when the vehicle is being driven with the roof in the open position and for which the accessory components, effective in the passenger compartment of the vehicle, can largely be dispensed with as protection against slip stream.

With the rear roof shell part, which remains above the vehicle parapet line also in the open position of the roof, the convertible vehicle, constructed pursuant to the invention, has a car body contour, by means of which, when the central part of the roof is shifted into the open position, driving comfort can be provided for the passengers of a vehicle with an open roof and, at the same time, an increased passive safety is achieved for the passengers in the passenger space owing to the fact that the upper roof shell part in the rear of the vehicle acts as a protective part, particularly in the case of a rolling-over accident.

In the open roof position, the rear roof shell part, for example, together with the rolled-up side window parts, form the boundary of the passenger compartment of the vehicle in such a manner that, without additional bulkheads, deflectors or similar components, a passenger compartment, which is largely unaffected by slip stream, is attained.

The roof shell part as a whole can be stiffened by a roll bar, which is integrated into the roof shell part and supported at the body, and the passenger compartment of the vehicle can be protected reliably in the case of a rolling-over accident by this additional safety element.

In an appropriate embodiment, the roof shell part, in the vicinity of the trunk, is connected by means of holding parts, which make a pivoting motion possible, with the body of the vehicle in such a manner, that the roof shell part can be swiveled up into a position, which enlarges the central roof opening. With that, an advantageously large space is achieved for automatically moving the central roof part, for example, when this part is shifted into a lowered position and the central part of the roof, which is provided as a hard top or a soft top, can be moved freely without affecting the passenger compartment of the vehicle.

Further details and advantages of the invention arise out of the following description and the drawings which illustrate an example of the inventive convertible vehicle.

IN THE DRAWINGS

FIG. 1 shows a side view of an inventive convertible vehicle with a roof construction in the closed position, FIG. 2 shows a perspective rear view of the convertible vehicle with a rear roof shell part in a pivoting position, FIG. 3 shows a side view of the convertible vehicle similar to that of FIG. 2, with a central roof shell part in a first opening phase, FIG. 4 shows a side view similar to that of FIG. 3 with the central roof part in the lowered position behind the vehicle seats, FIG. 5 shows a side view similar to that of FIG. 4 with the central roof part in the lowered position and the rear roof shell part in the driving position, FIG. 6 shows an enlarged cut-out representation of the rear roof shell part in the region of a hinge holding device supporting the rear roof shell part at the body, FIG. 7 shows an enlarged cut-out representation of a snap-in holding device connecting the roof shell part at the edge with the body of the vehicle, FIG. 8 shows a plan view of the two snap-in holding devices with one driving assembly in the rear region of the vehicle, FIG. 9 shows a sectional representation in the region of the snap-in holding device along the line IX—IX in FIG. 7, FIG. 10 shows a sectional representation of the driving assembly along a line X—X in FIG. 8, FIG. 11 shows a cross sectional representation of the rear roof shell part with the integrated roll bar along a line XI—XI of FIG. 2, and FIG. 12 shows an enlarged cut-out representation in the region of the snap-in holding devices with roof shell part having an integrated roll bar.

DESCRIPTION OF THE PREFERRED EMBODIMENTS

Figure 1:
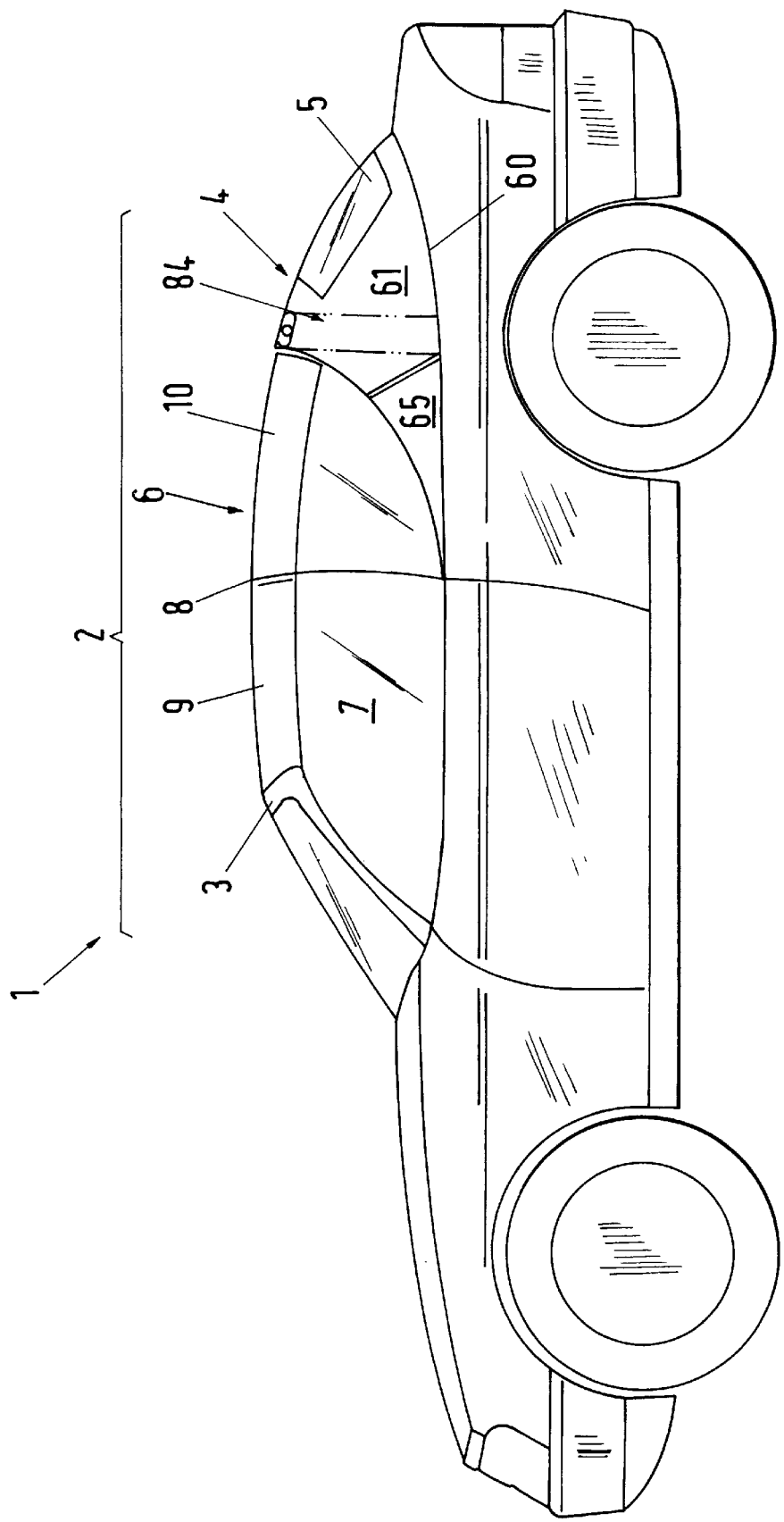

FIG. 1 shows a side view of a vehicle, which is labeled 1 as a whole and the roof 2 of which is constructed as a roof for a convertible vehicle. The roof 2 has a central roof part 6, which extends between a windshield frame 3 and a rear roof region 4 with a rear window 5 and can be shifted into an open position in such a manner, that the passenger compartment 7 of the vehicle is freed in the region of the roof contour between the windshield frame 3 and the rear roof region 4.

In the embodiment of the convertible vehicle 1 shown, the central part 6 of the roof is formed from two partial roof pieces 9 and 10, which adjoin one another in the region of a dividing plane 8. These partial roof pieces 9 and 10 are connected over joint connectors 13, which are disposed symmetrically to a longitudinal axis 12 of the vehicle (FIG. 2) and in each case engage the edge and which, in turn, act together with a driving unit 15, which engages the rear roof piece 10 and is provided with a pivoting drive 19 and a lowering drive 20.

Figure 3:
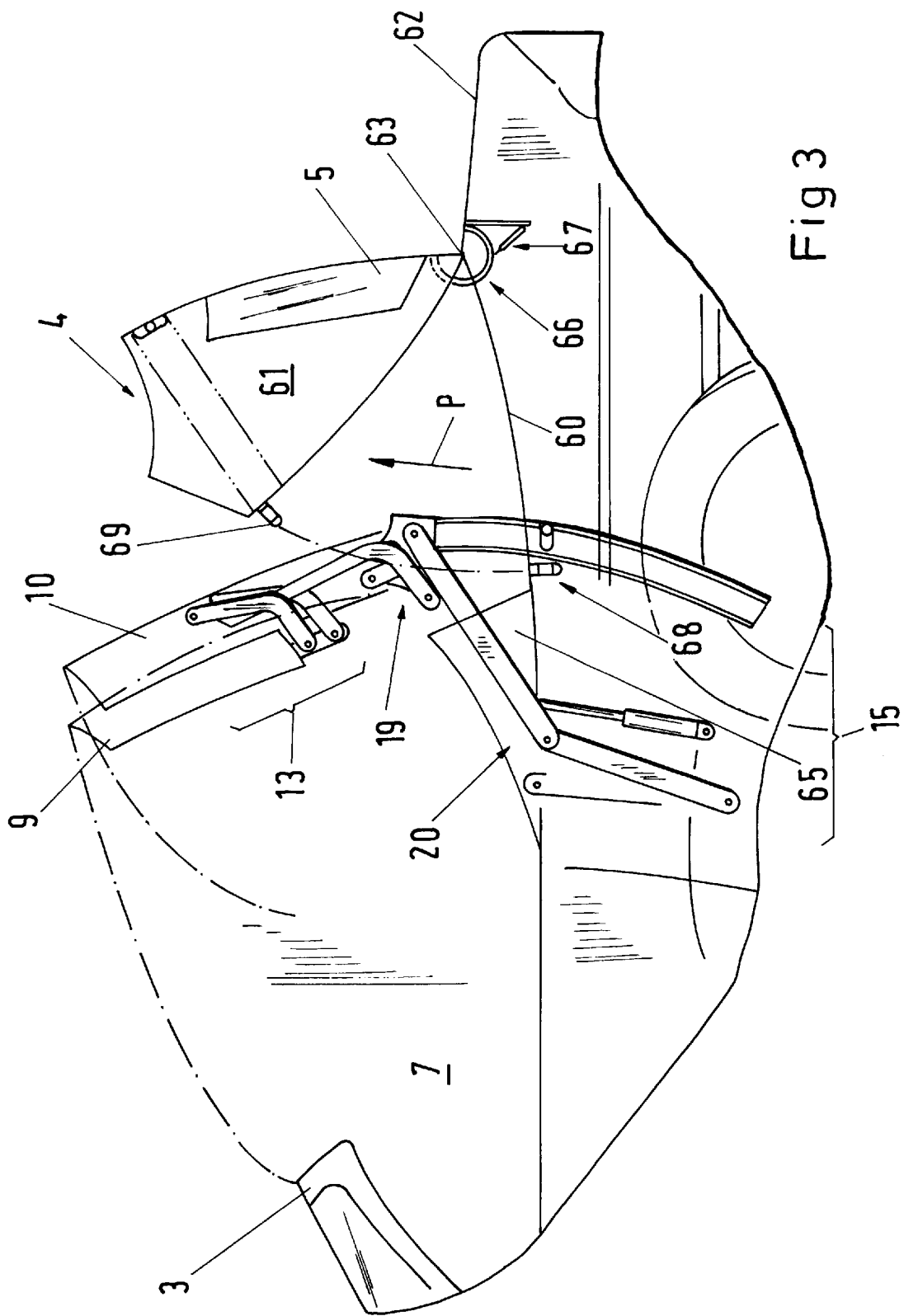
Figure 4:
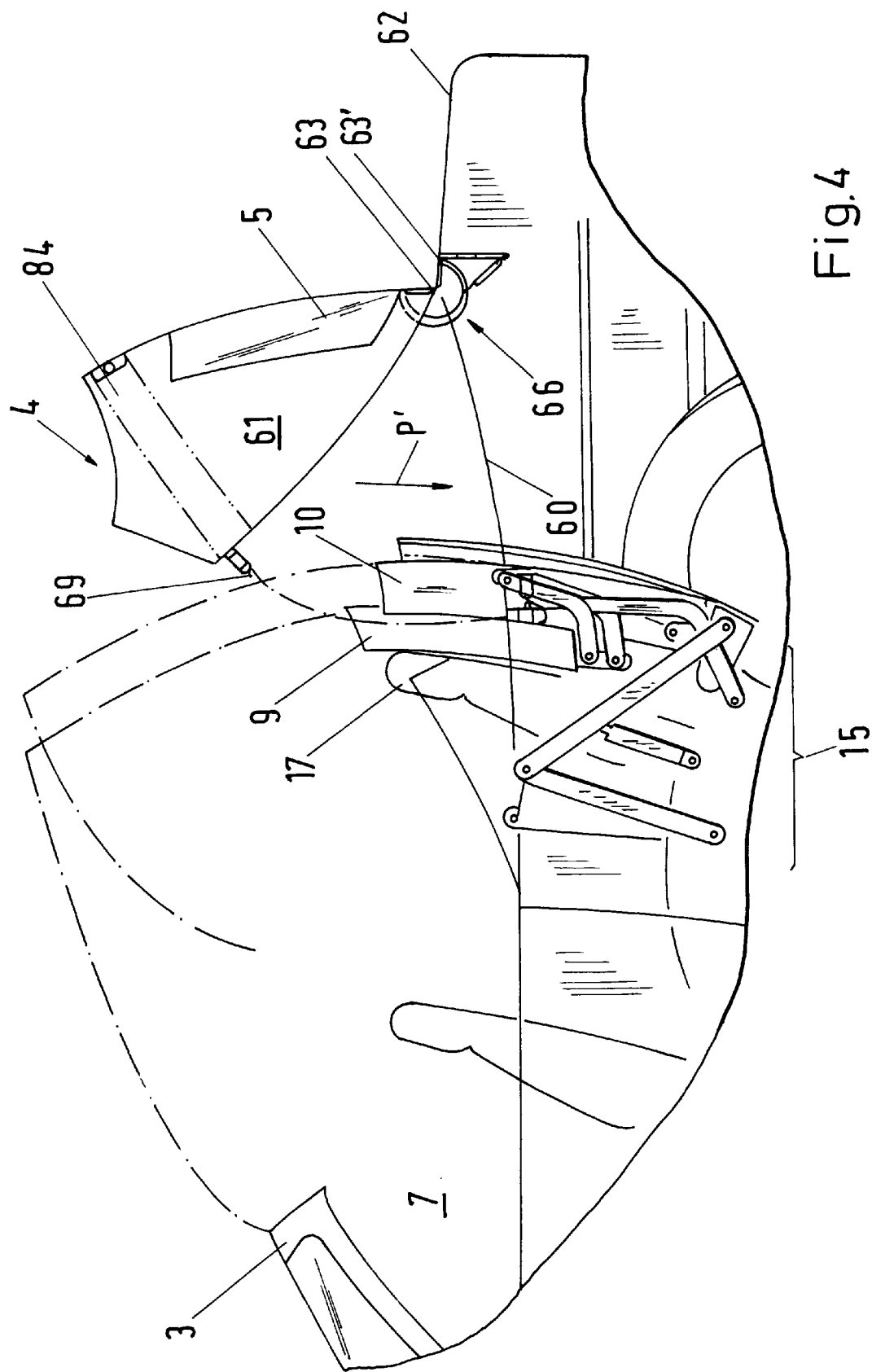
Figure 5:
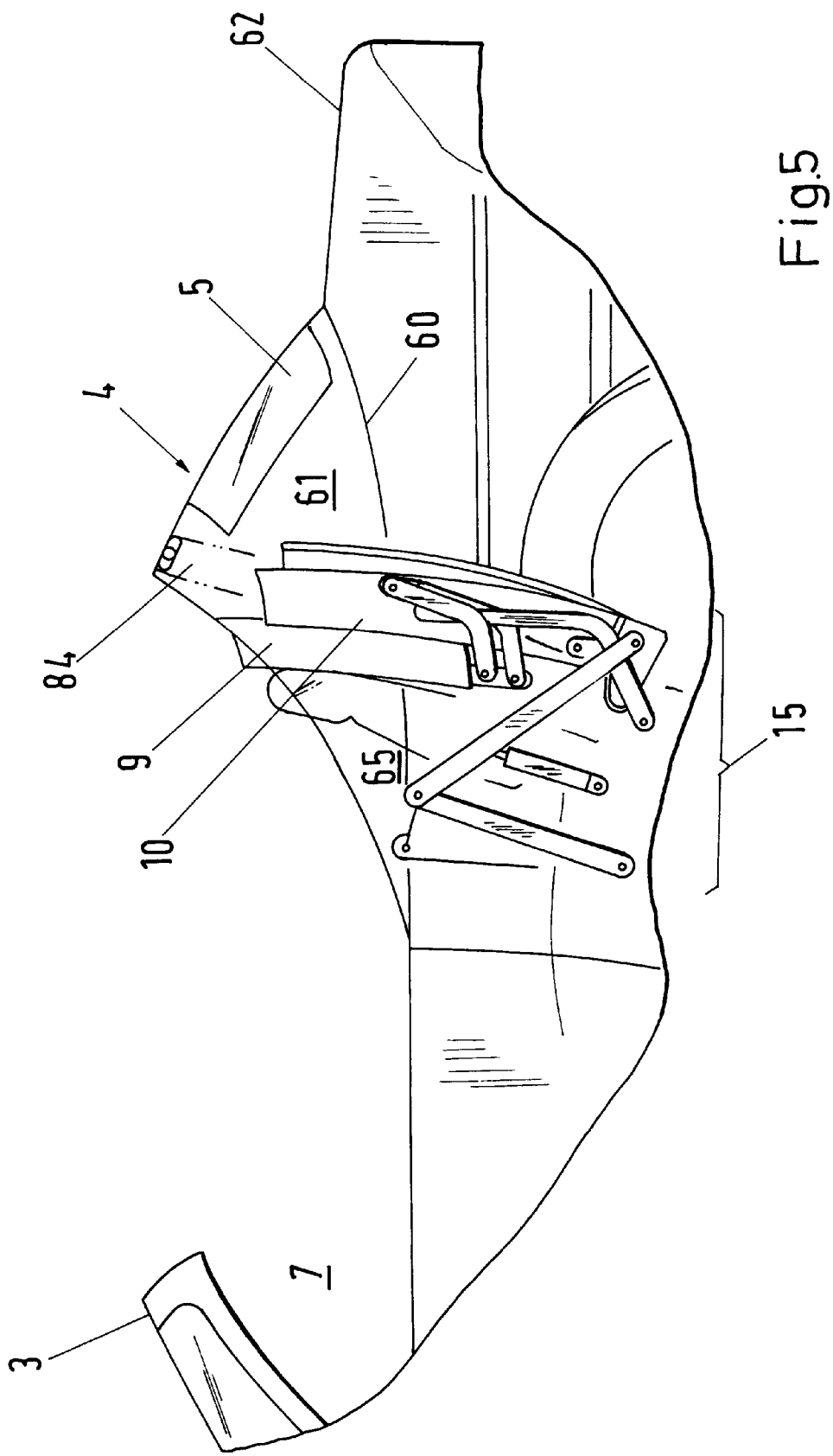

The different movement phases of the central part of the roof in FIGS. 3 to 5 illustrate the opening process of the roof 2, the two-part central part 6 of the roof, upon reaching the open position, being lowered behind the rear seats 17 (FIG. 4).

In the case of the convertible vehicle 4 of the inventive construction, the rear roof region 4 is provided as a roof shell part 61, which remains above a vehicle parapet line 60 even when the central part 6 of the roof is in the open position (FIG. 5) and forms a rear boundary.

This roof shell part 61 can be constructed, for example, in the case of a four-seater convertible vehicle, as an assembly (not shown), which is connected rigidly with the body of the vehicle and the central part 6, forming the vehicle roof 2 with this assembly, can be provided in a further conceivable embodiment as a soft top, which is supported at the body over an appropriate pivoting rod assembly.

In the embodiment shown (FIG. 2), the roof shell part 61 is provided as an assembly, which is supported pivotably at the vehicle body. This assembly defines a pivoting axis 63 in the vicinity of the trunk lid 62 in such a manner, that the roof shell part 61 can be swiveled up counter to the driving direction into an open position (arrow P, FIG. 3) or, in the case of the reverse motion, swiveled back into the respective closest position (arrow P', FIG. 4).

Figure 2:
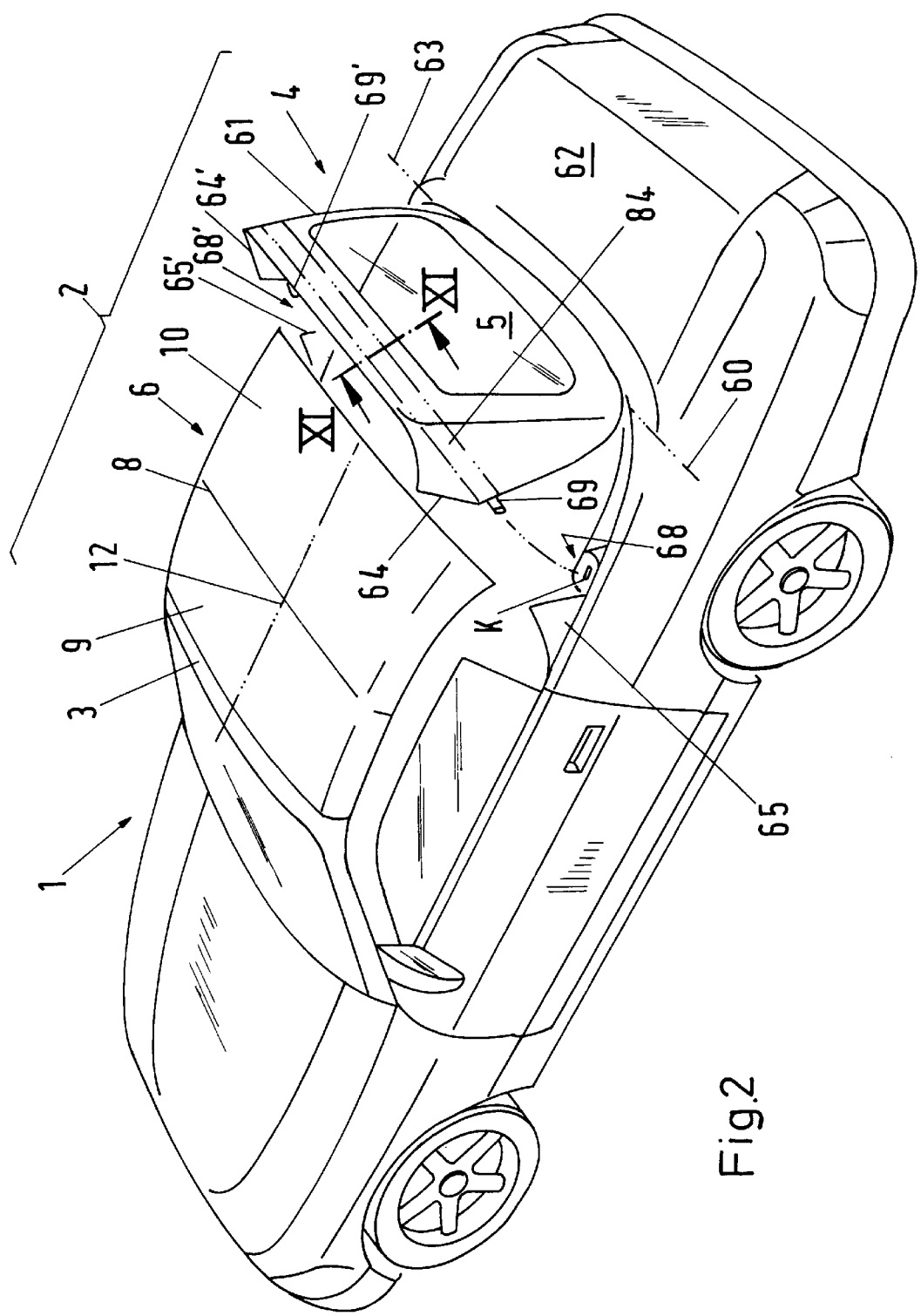

The perspective rear view of the vehicle 1 of FIG. 2 illustrates that the pivotable roof shell part 61 forms an essentially U-shaped closing contour and that the respective front side edges 64, 64' lies in the closed position against a parapet part 65, 65' attached to the body.

In the region of the pivoting axis 63, the roof shell part 61 is provided with a pivoting hinge 66 (FIG. 6), which can be controlled automatically over a driving device 67, so that the roof shell part 61 is detached from the parts of the snap-in holding devices 68, 68'. which are provided in the front region of the side edges 64, 64' or on the body in the vicinity of the parapet part 65, 65', and can be swiveled up into the open position (FIG. 2). During the closing process (arrow P', FIG. 4), the respective snap-in projecting parts 69, 69', after being introduced into an opening K in the body, are locked so that, in the closed position, the roof shell part 61 is fixed in the body.

Figure 6:
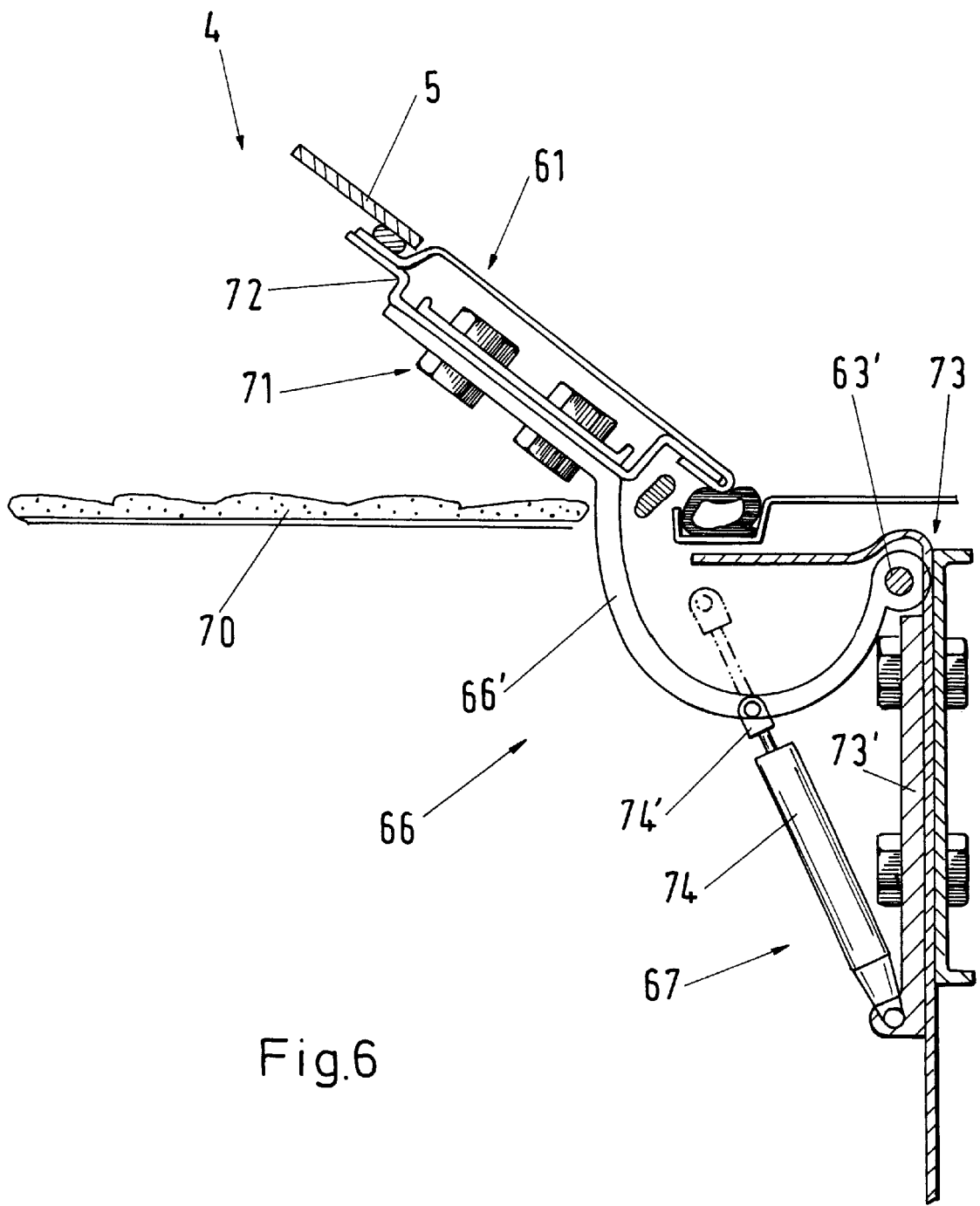

In FIG. 6, an enlarged representation illustrates the construction of the roof shell part 61 with the pivoting hinge 66 which, on the one hand, reaches through a rear shelf 70 below connecting parts 71 in the form of screws with a holding plate 72 and, on the other, is supported over holding parts 73 at the body and which has a hydraulic cylinder 74 that is provided as driving device 67. The hydraulic cylinder 74 is supported solidly in the region of a supporting plate 73 and the piston rod 74' engages the pivoting hinge 66 at a pivoting lever 66', which has a pivoting joint 63 at the body. With this pivotable supporting system, the roof shell part 61 can be swiveled with little structural effort into the above-described open and closed positions.

Figure 7:
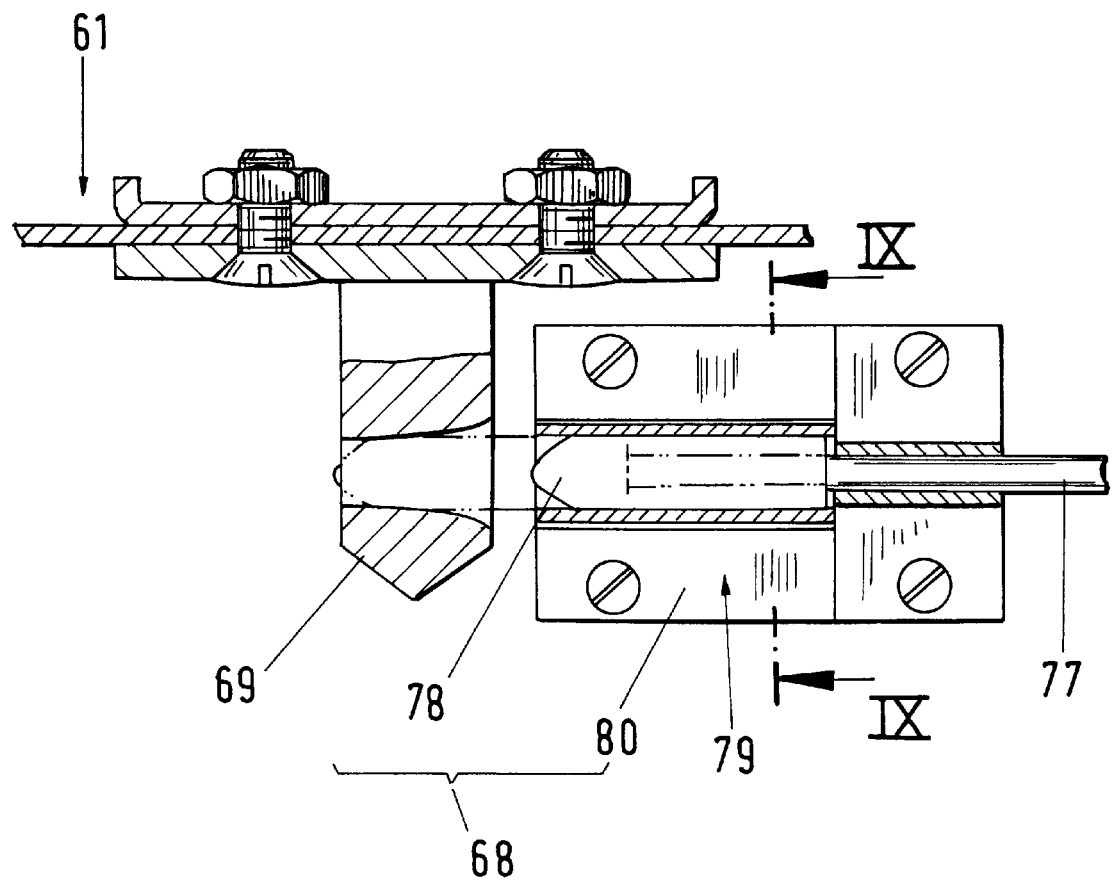
Figure 8:
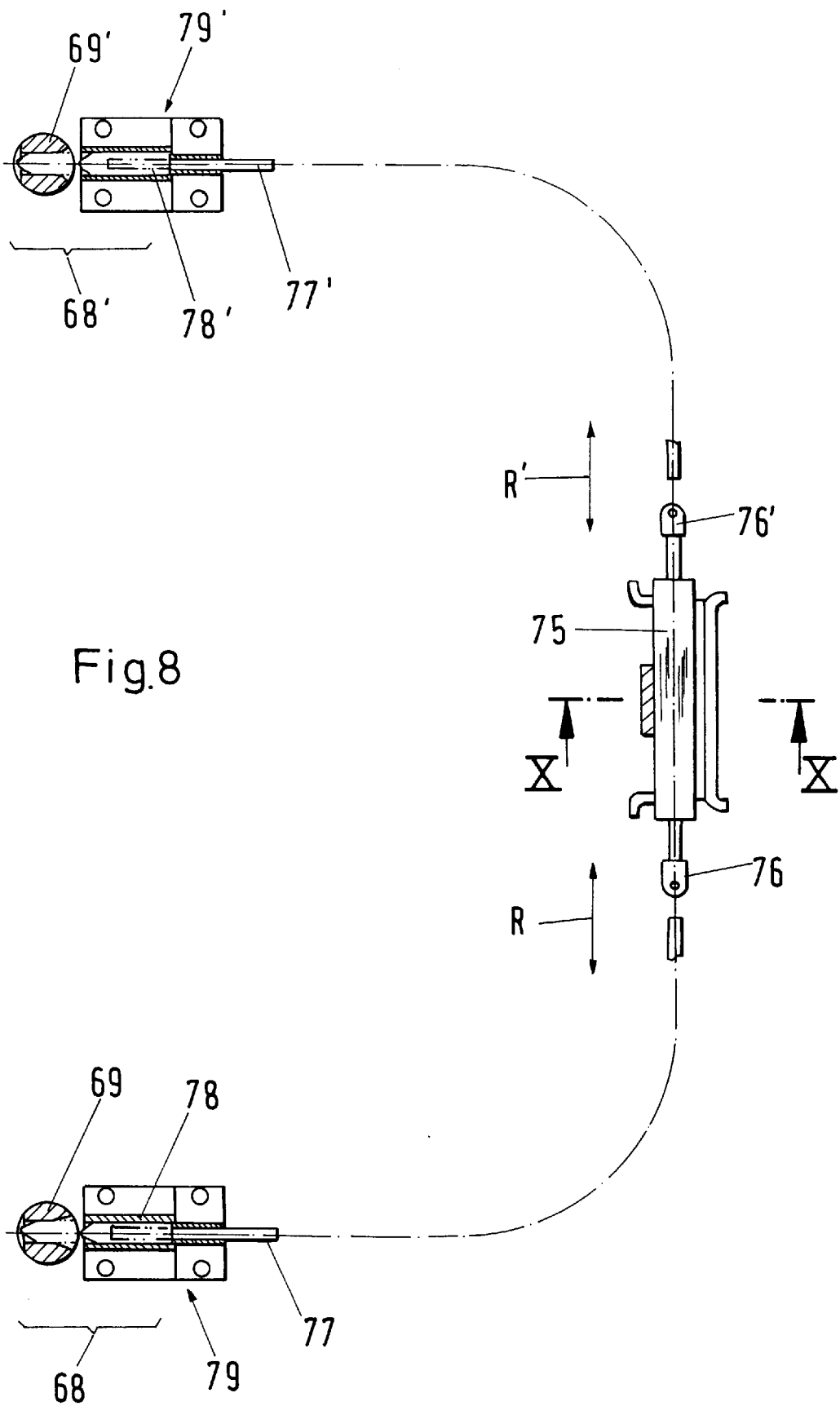
Figure 9:
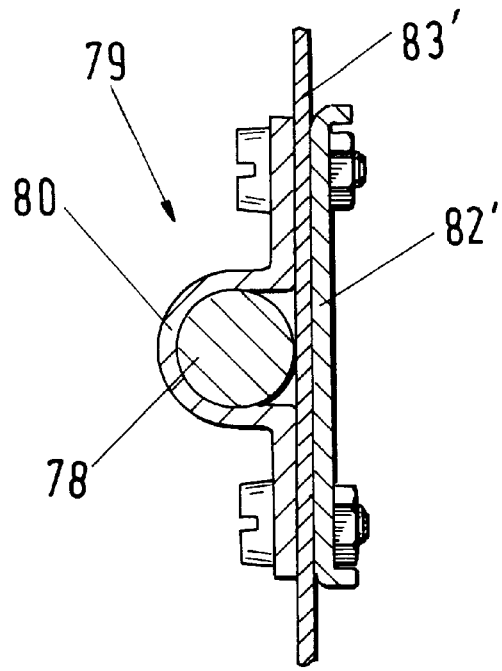

The detailed representation of FIG. 7, in conjunction with the plan view of FIG. 8, illustrates an appropriate constructive formation of the snap-in holding devices 68, 68' for fixing the roof shell part 61 to the body. At the same time, a driving device in the form of a hydraulic cylinder 75 (FIG. 8) is provided, which is supported in the rear region of the vehicle and has two piston rods 76, 76', which act in the direction of arrows R, R' and are connected over Bowden cables 77, 77', acting as push-pull parts, with locking bolts 78, 78' in the region of the guiding parts 79, 79' on the body of the vehicle. By means of an appropriate movement of the locking bolts 78, 78' under the action of the hydraulic cylinder 75 or its piston rod 76, 76' acting in the direction of the arrows R, R', the locking bolts 78, 78' can be introduced into a slot of the snap-in projecting parts 69, 69' and, with that, the roof shell part 61 can be locked. In the represen- tation of FIG. 7, the connecting engagement in the region of the snap-in holding device 68 is illustrated by lines of dots and dashes. The sectional representation of FIG. 9 shows the locking bolt 78 in cross section. In an appropriate embodiment, the locking bolt 78 is held movably at the guiding component 79 by a guide strap 80, which is bolted to the body of the vehicle.

Figure 10:
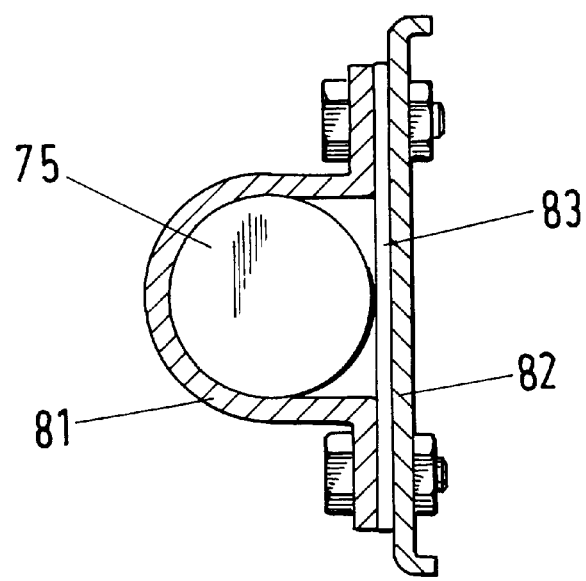

The sectional representation of FIG. 10 illustrates how the hydraulic cylinder drive 75 is fixed by means of a holding strap 81 and a counter element 82 to the rear wall 83 of the vehicle body.

Figure 11:
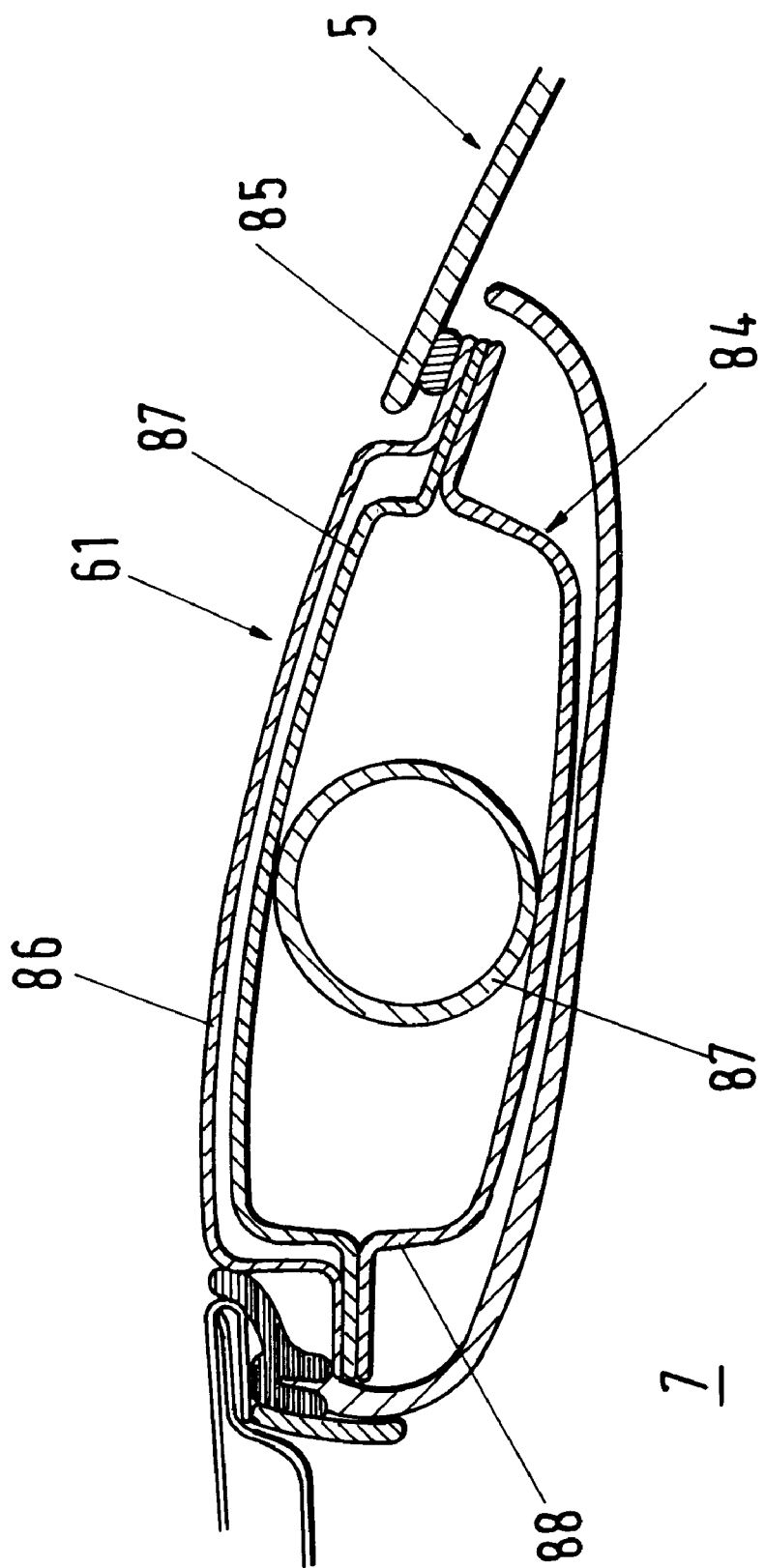

A further, improved version of the above-described roof shell part 61 is illustrated by the representation of FIG. 2 in conjunction with that of FIG. 11. A discontinuous line shows the advantageous construction of the roof shell part 61 with a roll bar 84, which is integrated into the contour of the roof shell part 61 and extends transversely to the longitudinal axis 12 of the vehicle between the parts of the snap-in holding devices 68, 68', which are provided at the front side wall 64, 64'.

In the closed position of the roof shell part 61 and when driving with the roof closed (FIG. 1) as well as with the roof open (FIG. 5), this integrated roll bar 84 is provided as an additional protective element for the passengers in the passenger compartment 7 of the vehicle. The integrated roll bar 84, in the course of its installed contour, brings about a stiffening of the roof shell part 61 above the rear window 5, so that, stresses on the roof shell part 61, which occur particularly during a rolling-over accident, can be absorbed in the upper edge region and dissipated in the form of collision protection into the vehicle body over the regions of the roll bar 84 connecting the latter to the body of the vehicle.

The cross-sectional representation of the roof shell part 61 in the region of the roll bar 84 of FIG. 11 illustrates that the roll bar 84 is provided with U-shaped parts 87, 88 which, in the vicinity of the rear window edge 85, grip below a roof skin region 86 of the roof shell part 61 and between which a reinforcing pipe 89 extends. Towards the passenger compartment 7 of the vehicle, the roll bar 84 is covered by a molding 90.

Figure 12:
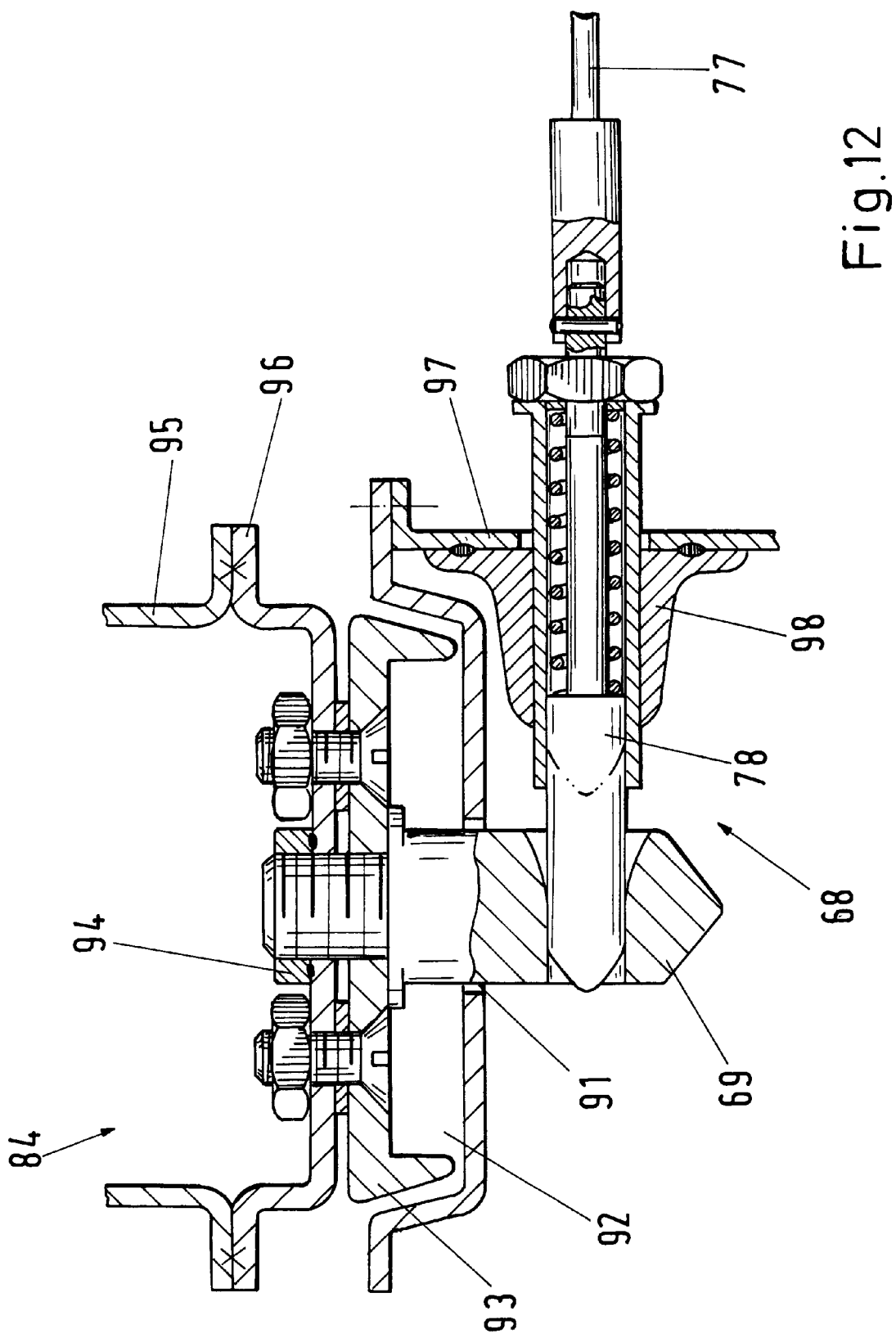

In FIG. 12, the support of the roof shell part 61 with the roll bar 84 at the body is shown in the lateral region of the snap-in holding devices 68, 68' in a representation similar to that of FIG. 7, the stability for dissipating collision forces to the body of the vehicle being increased by additional supporting parts. With the respective snap-in projecting part 69, the roll bar 84 passes through a slot 91 in the region of a molded cavity 92 of the body, in which a counter element 93 at the end of the roll bar 84 is accurately positioned so that the roll bar 84, particularly when subjected to high compressions and/or transverse forces, remains in its functional, installed position. The counter element 93 is connected stably with the roll bar 84 over a weld nut 94 and a reinforcing part 95 with a holding plate 96 and the stability of the connection is improved in the region of the locking bolt 78 by a sleeve part 98 fixed over a supporting plate 97 to the body of the vehicle.

What I claim is:

1. A convertible vehicle including a vehicle body having a passenger compartment and a passenger compartment parapet, a windshield frame on the vehicle body, a rear roof shell on the vehicle body, a roll bar integrated into said roof shell, said roll bar comprising, in cross section, two generally U-shaped parts in which a cavity is formed between the two U-shaped parts and a reinforcing member is disposed in said cavity, a central roof part mounted on the vehicle body moveable between closed and open positions, said central roof part extending generally horizontally between said windshield frame and said roof shell when in said closed position, said central roof part uncovering parts of the passenger compartment when in the open position, said roof shell extending above said parapet when the central roof part is in the open position.

2. A convertible vehicle according to claim 1 including an outer roof layer disposed over said roll bar, said two U-shaped parts having edge portions joined to one another at a joining portion disposed below said outer roof layer, said roof shell including a window disposed generally rearwardly of said roll bar, said window having an edge, said joining portion being disposed in superimposed relationship relative to said edge of said rear window.

3. A convertible vehicle including a vehicle body having a passenger compartment and a passenger compartment parapet, a windshield frame on the vehicle body, a rear roof shell on the vehicle body, a pivot connection pivotably connecting said roof shell to said vehicle body for pivotable movement between open and closed positions, a holder on said roof shell and said vehicle body which holds said roof shell to said vehicle body when said roof shell is in said closed position, said holder including a snap-in holding device having a protruding element and a receiving element receiving said protruding element, a central roof part mounted on the vehicle body moveable between closed and open positions, said central roof part extending generally horizontally between said windshield frame and said roof shell when said central roof is in its closed position, said central roof part uncovering parts of the passenger compartment when said central roof part is in its open position, said roof shell extending above said parapet when said central roof part is in its open position.

4. A convertible vehicle including a vehicle body having a passenger compartment and a passenger compartment parapet, a windshield frame on the vehicle body, a rear roof shell on the vehicle body, a pivot connection pivotably connecting said roof shell to said vehicle body for pivotal movement between an open and closed position, a securing device securing said roof shell to said vehicle body when said roof shell is in said closed position and unsecuring said roof shell from said vehicle body when said roof shell is in said open position, a roll bar on said roof shell, said securing device being disposed on said roll bar and said vehicle body, a central roof part mounted on the vehicle body moveable between closed and open positions, said central roof part extending generally horizontally between said windshield frame and said roof shell when said central roof part is in its closed position, said central roof part uncovering parts of the passenger compartment when said central roof part is in its open position, said roof shell extending above said parapet when said central roof part is in its open position.

5. A convertible vehicle including a vehicle body having a passenger compartment and a passenger compartment parapet, a windshield frame on the vehicle body, a rear roof shell on the vehicle body, said roof shell includes a roll bar having end sections, a support structure on said end sections, said support structure including a first engageable member, a second engageable member mounted on the vehicle body, a pivot connection pivotably connecting said roof shell on said vehicle body for pivotal movement between a closed position and an open position, said first engageable element engaging said second engageable element when said roof shell is in said closed position, said first engageable element being disengaged from said second engageable element when said roof shell is in said open position, a central roof part mounted on the vehicle body moveable between closed and open positions, said central roof part extending generally horizontally between said windshield frame and said roof shell when said central roof part is in its closed position, said central roof part uncovering parts of the passenger compartment when said central roof part is in its open position, said roof shell extending above said parapet when said central roof part is in its open position.

6. A convertible vehicle according to claim 5 further comprising an actuator on said vehicle body for moving said second engageable element into position to engage said first engageable element and to move said second engageable element into position to disengage from said first engageable element.

7. A convertible vehicle including a vehicle body having a passenger compartment and a passenger compartment parapet, a windshield frame on the vehicle body, a rear roof shell on the vehicle body movable between open and closed positions, said roof shell being spaced from said parapet when in said open position, said roof shell being juxtaposed to said parapet when in said closed position, a central roof part mounted on the vehicle body having a position extending generally horizontally between said windshield frame and said roof shell when said roof shell is in said closed position, and further including a stiffening structure in the form of a roll over bar disposed in said roof shell and operable to provide a safety enhancing collision protecting structure upon occurrence of a roll over accident of said vehicle when said roof shell is in said closed position.

8. A convertible vehicle according to claim 7 further comprising a securing device on said roll over bar and on said vehicle body for securing said roll over bar to said vehicle body when said roof shell is in said closed position.

9. A convertible vehicle according to claim 8 wherein said roll bar is integrated into said roof shell.

10. A convertible vehicle according to claim 8 wherein said roll bar has a contour generally conforming to the contour of said roof shell.

11. A convertible vehicle according to claim 8 further comprising a pivot connection pivotably connecting said roof shell to said vehicle body for pivotable movement between its open and closed positions, a holder on said roll bar and said vehicle body which holds said roll bar to said vehicle body when said roof shell is in said closed position.

12. A convertible vehicle according to claim 8 wherein said securing device includes release parts to effect release of said roll bar from said vehicle body.

13. A convertible vehicle including a vehicle body having a passenger compartment, a windshield frame on the vehicle body, a rear roof shell on the vehicle body movable between a closed position and an open position, a central roof part mounted on the vehicle body moveable between closed and open positions, said central roof part extending generally horizontally between said windshield frame and said roof shell when said central roof part is in its closed position and said roof shell is in its closed position, said central roof part uncovering parts of the passenger compartment when said central roof part is in its open position, said roof shell being in its open position when said central roof part is being moved between its open and closed positions, and further including a stiffening structure in the form of a roll over bar disposed in said roof shell and operable to provide a safety enhancing collision protecting structure upon occurrence of a roll over accident of said vehicle when said roof shell is in said closed position.

14. A convertible vehicle according to claim 13 wherein said roll bar has end sections, a support structure on said end sections, said support structure including a first engageable member, a second engageable member mounted on the vehicle body, said first engageable member engaging said second engageable member when said roof shell is in its closed position, said first engageable member being disengaged from said second engageable member when said roof shell is in its open position.

* * * * *